United States Patent [19]

Romano

[11] Patent Number: 4,859,984

[45] Date of Patent: Aug. 22, 1989

[54] DEVICE FOR DISPLAYING THE GEAR PARAMETERS OF A BICYCLE OR THE LIKE

[75] Inventor: Antonio Romano, Padova, Italy

[73] Assignee: Campagnolo S.p.A., Vicenza, Italy

[21] Appl. No.: 105,075

[22] Filed: Sep. 29, 1987

[30] Foreign Application Priority Data

Sep. 30, 1986 [IT] Italy .............................. 53895/86 [U]

[51] Int. Cl.⁴ ............................................... B62J 6/00
[52] U.S. Cl. .................................... 340/432; 340/456; 340/462
[58] Field of Search .................. 340/134, 52 F, 52 R; 364/424.1; 280/236; 74/DIG. 7; 116/28.1; 200/61.88

[56] References Cited

U.S. PATENT DOCUMENTS

| | | | |
|---|---|---|---|
| 3,189,701 | 6/1965 | Brown | 200/61.88 |
| 3,662,129 | 5/1972 | Lewis | 200/61.88 |
| 4,270,481 | 6/1981 | Watarai | 116/28.1 |
| 4,490,127 | 12/1984 | Matsumoto et al. | 280/236 X |
| 4,605,240 | 8/1986 | Clem et al. | 280/236 |

Primary Examiner—Joseph A. Orsino
Assistant Examiner—Brian R. Tumm
Attorney, Agent, or Firm—Kenyon & Kenyon

[57] ABSTRACT

A device for displaying the gear parameters of a bicycle comprises a sensor for detecting the position of the member (or members) for controlling the gear-change, and display means connected to the sensor means and able to supply a signal indicative of the ratio engaged. In a preferred embodiment, the number of teeth of the two gear-wheels (front and rear) on which the chain is engaged are displayed.

3 Claims, 3 Drawing Sheets

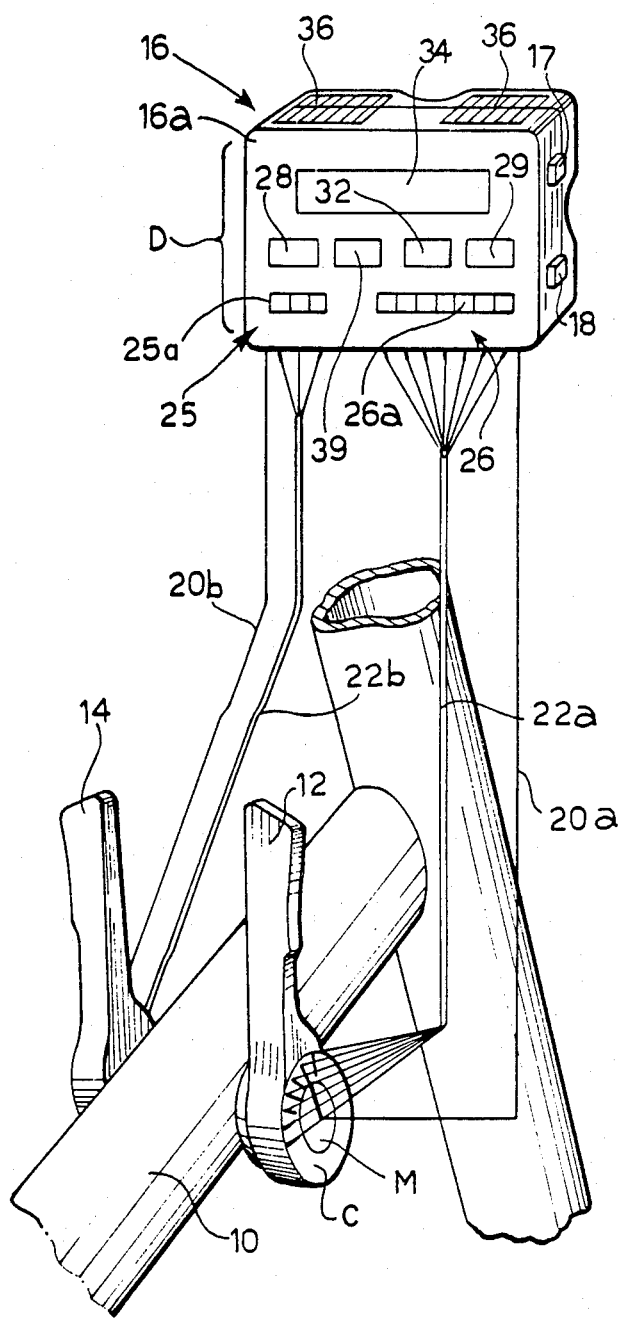
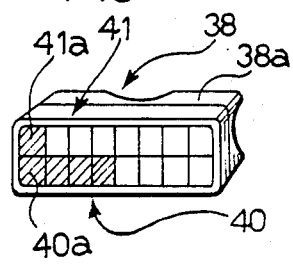
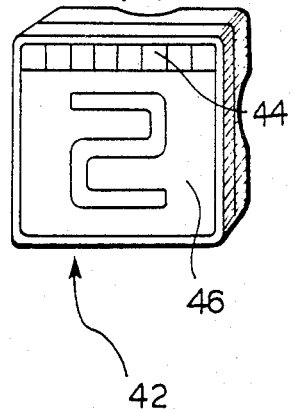

DEVICE FOR DISPLAYING THE GEAR PARAMETERS OF A BICYCLE OR THE LIKE

DESCRIPTION

The present invention relates to a device for displaying the gear parameters of a bicycle or the like of a conventional type including a driving chain which is selectively engageable with a series of sprockets connected to the hub of the rear wheel in order to obtain different gear ratios, and a member for controlling the lateral movement of the chain from one sprocket to another.

In bicycles of this type, the user cannot get immediate information about the ratio engaged other than by relying on his own sensitivity or a direct observation of the sprockets, the latter operation involving a certain amount of risk.

The object of the present invention is to provide a device which will solve the aforesaid disadvantage and be simple and economical to produce.

In order to achieve this object, the device according to the invention is characterised in that it comprises sensor means for detecting the position of the control member and display means connected to the sensor means and able to supply a signal indicative of the gear engaged.

The invention is particularly applicable, of course, to the case in which one of the pedals of the bicycle is associated with a further series of gears selectively engageable by the chain, and in which a further member is provided for controlling the derailment of the chain from one gear to another.

In this case, the display means can also supply a signal indicative of the gear with which the chain is engaged.

In a preferred embodiment, the display means can display the number of teeth of the sprocket and gear selected from item to time.

In this way, the user can always check the speed ratio at which he is pedalling, without having recourse to particular sensitivity or experience and without the need for a dangerous direct observation.

Further advantages and characteristics of the device according to the invention will become apparent from the detailed description which follows, purely by way of non-limiting example, with reference to the appended drawings, in which:

BRIEF DESCRIPTION OF THE DRAWINGS

FIG. 1 is a view of the device as a whole,
FIG. 2 is a detail of one display,
FIG. 3 is a detail similar to FIG. 2.

DETAILED DESCRIPTION OF THE PREFERRED EMBODIMENT

Figure 4:
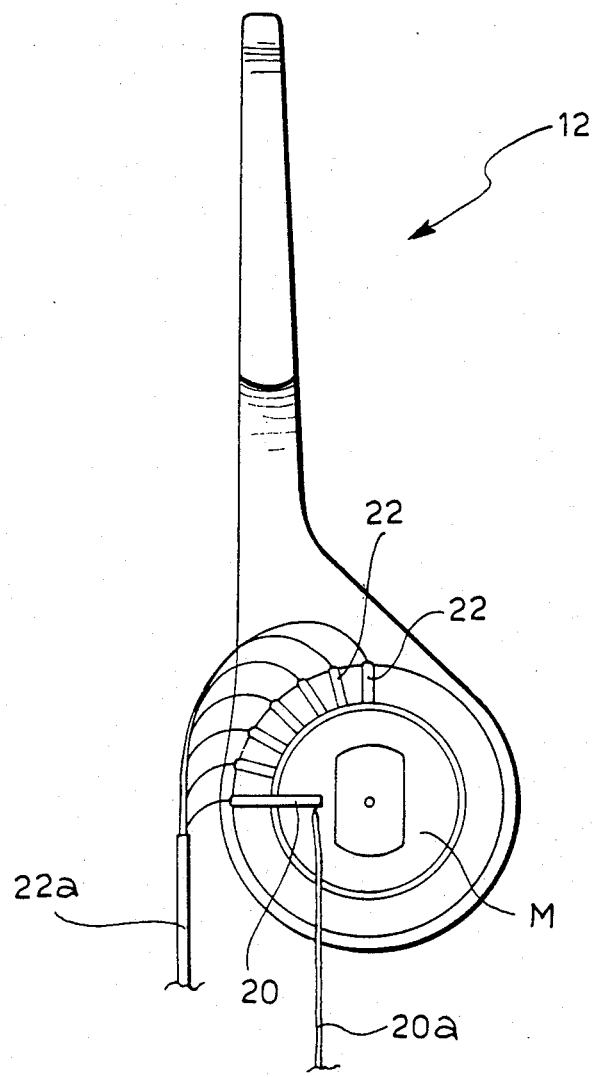
FIG. 4 is a partially-sectioned side view of a control member according to the invention.
Figure 5:
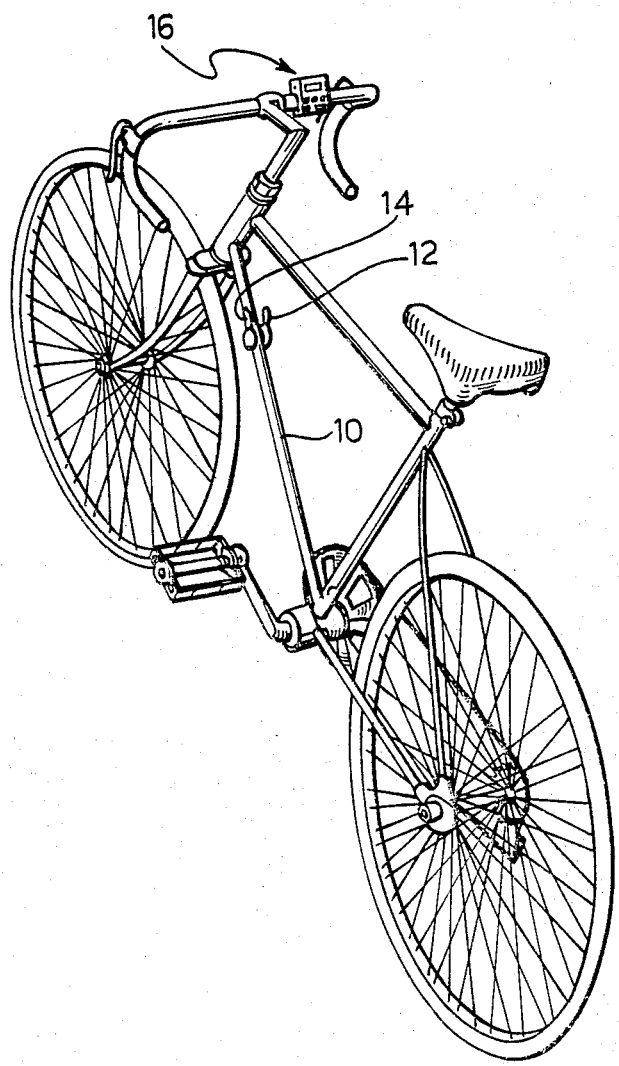
FIG. 5 is a view of the device mounted upon a bicycle.

With reference to the drawings, a bicycle frame is indicated 10 on which is rotatably mounted a pair of levers 12 and 14 for operating the gear-change and the derailleur (not illustrated) of the bicycle, respectively. By gear-change is meant the mechanical device which is controlled by the lever 12 and can move the driving chain selectively from one sprocket of the rear wheel to another, while by derailleur is meant the mechanical device which is controlled by the lever 14 and can move the chain selectively from one gear to another, the gears usually being associated with the right-hand pedal.

A display device, indicated 16, has a housing 16a and liquid crystal displays, generally indicated D. The housing 16a has two lateral push-buttons 17 and 18 respectively, the purpose of which will become clear from the following description.

The levers 12 and 14 are rotatably mounted on hubs M having a fixed electrical contact 20 disposed radially. The lever 12 has an annular portion C on which sliding contacts 22 are mounted radially for snap-engagement with the fixed contact 20 when the lever is rotated. The contacts 22 are appropriately spaced in accordance with the number of sprockets associated with the hub of the rear wheel. The fixed contact 20 and the movable contacts 22 are connected to the display device 16 by a bundle of wires 22a and a wire 20a. In a wholly similar manner, the control lever 14 is conncetéd to the display device 16 by a bundle of wires 22b and a wire 20b.

The displays D at the bottom comprise an analogue display 25 and an analogue display 26 which indicate the position of the chain on the gears and sprockets, respectively, by the darkening of one or more of the squares 25a and 26a. The displays 28 and 29 higher up, also of liquid crystals, give respectively the number of teeth of the gear engaged by the chain at a given moment and the number of teeth of the sprocket also engaged by the chain. The displays 39 and 32 can be used, like that which has already happened with the so-called "trip computers" fitted on bicycles, for the speed and distance covered, repsectively. Finally, the display 34 can be used to advantage to supply the development in metres for each push on a pedal where the display of distance travelled corresponds to th revolutions of the pedal.

When the user decides to change the arrangement of the sprockets associated with the rear wheel or the arrangement of the gears associated with the pedals, it suffices to set in, for example by means of the button 18, the numbers of teeth of the sprockets and gears fitted to the bicycle; the button 18 being used to sequence the desired number in a known manner. The button 17 is used, for example, to set the distance covered to zero. The electrical supply to the display device 16 is assured by solar cells 36 located on the top of the housing 16a. These numbers are stored and sequenced by a microprocesor with memory storage as is known to one skilled in the art.

FIG. 2 illustrates a simplified version of a display. This, indicated 38, comprises a housing 38a and a pair of analogue displays 40 and 41 for indicating, respectively, the sprocket and the gear with which the chain is engaged. The display occurs by darkening of the squares 40a and 41a; for example, FIG. 2 shows clearly the situation in which the chain is on the sprocket mounted fourth from the hub of the rear wheel, while the gear engaged by the chain is that nearest the hub of the pedal. To advantage, the display device 38 is supplied by batteries.

FIG. 3 illustrates a different type of display device, indicated 42. The device 42 has an analogue display 44 at the top and a digital display 46 for displaying the position of the chain on the sprockets. For example, FIG. 3 shows the situation in which the second sprocket from the hub is engaged; the display 44 can be used to advantage to indicate the position of the chain on the gears.

It is understood that this invention extends to models which achieve equal utility by using the same innovative concept.

I claim:

1. A device for displaying gear parameters of a bicycle, including a driving chain engageable selectively with a series of sprockets connected to the hub of the wheel in order to obtain different gear ratios and a member for controlling the lateral movement of the chain from one sprocket to another, said device further comprisng:
   (a) sensor means for detecting the position of the control member;
   (b) display means connected to the sensor means and able to supply a signal indicative of the ratio engaged;
   (c) said display means displaying the number of teeth of a particular sprocket of said series of sprockets with which the chain is engaged; and
   (d) wherein said display means supplies the value of the distance covered by each push on a pedal.

2. Device for displaying the gear parameters of a bicycle including a driving chain engageable selectively with a series of sprockets connected to the hub of the rear wheel in order to obtain different gear ratios, and a member for controlling the lateral movement of the chain from one sprocket to another, said device further comprising:
   (a) sensor means for detecting the position of the control member;
   (b) display means connected to the sensor means and able to supply a signal indicative of the ratio engaged; and
   (c) said control member including a lever mounted rotatably on a hub fixed to the frame of the bicycle, wherein the sensor means comprise a plurality of movable contacts fixed to the lever and a fixed contact fixed to the hub in such manner that upon the rotation of the lever, the movable contacts are selectively snap-engaged with the fixed contact so as to ensure both an electrical connection between the contacts and the precise positioning of the lever, the movable contacts having a mutual spacing chosen in dependence on the number of sprockets assiciated with the hub of the rear wheel.

3. A device for displaying gear parameters of a bicycle, including a driving chain engageable selectively with a series of sprockets connected to the hub of the wheel in order to obtain different gear ratios and a member for controlling the lateral movement of the chain from one sprocket to another, said device further comprising:
   (a) sensor means for detecting the position of the control member;
   (b) display means connected to the sensor means and able to supply a signal indicative of the ratio engaged;
   (c) said display means displaying the number of teeth of a particular sprocket of said series of sprockets with which the chain is engaged; and
   (d) said display means including means for manual input of data relating to the numbers of teeth of the sprockets and the gears.

* * * * *